Sept. 18, 1951 E. P. VAN SCIVER 2,568,474
AUTOMATIC WATER HEATER FOR BEVERAGES
Filed April 28, 1949 3 Sheets-Sheet 1

Inventor:
Edwin P. Van Sciver
by his Attorneys
Howson & Howson

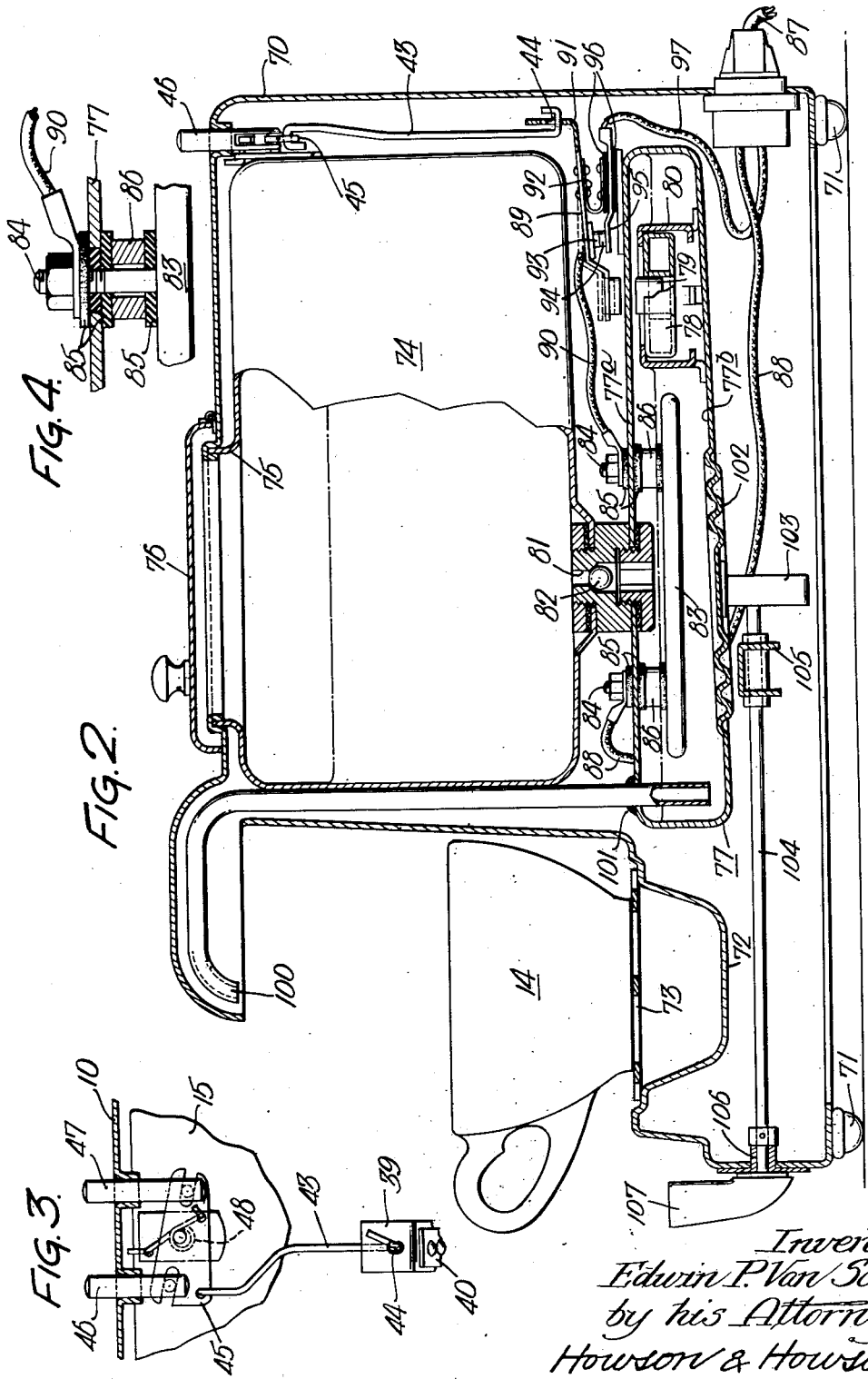

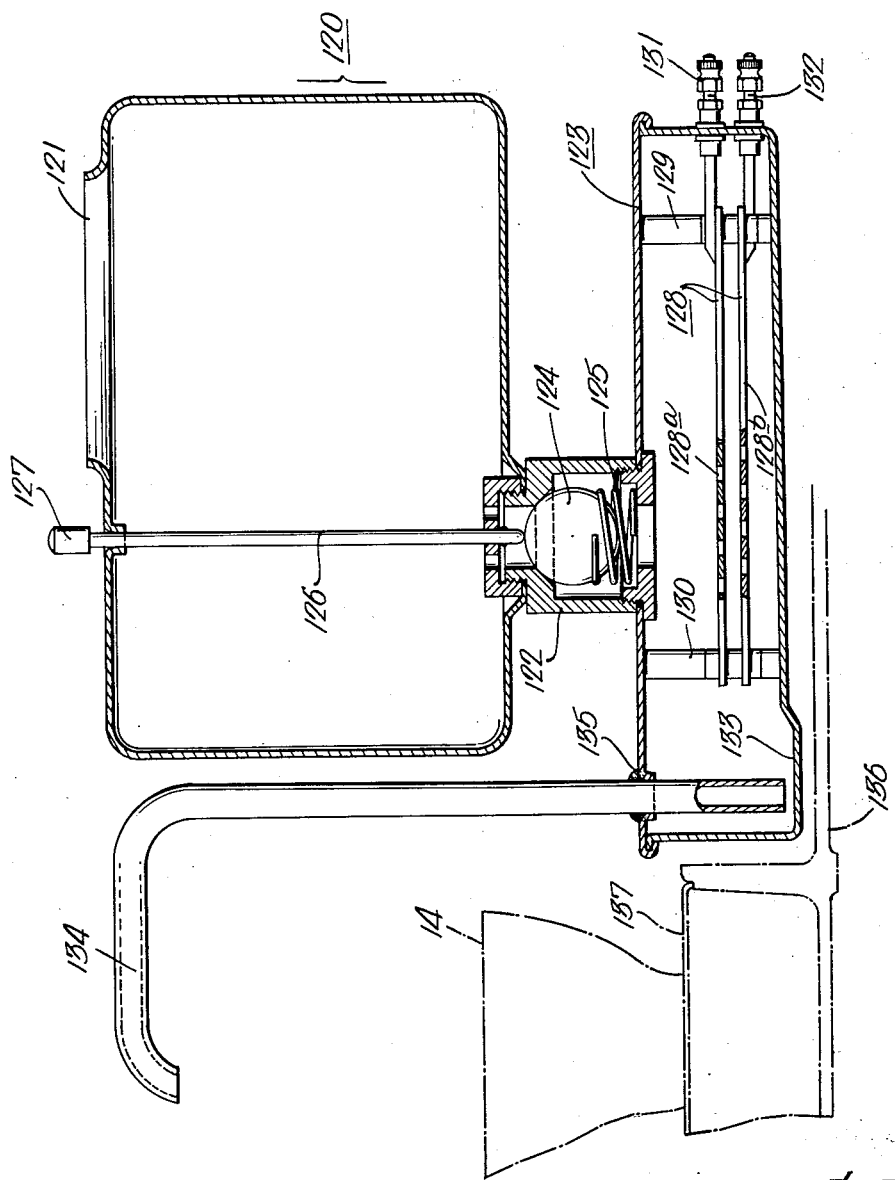

Patented Sept. 18, 1951

2,568,474

UNITED STATES PATENT OFFICE 2,568,474

AUTOMATIC WATER HEATER FOR BEVERAGES

Edwin P. Van Sciver, Philadelphia, Pa., assignor of one-third to Earl T. Van Sciver, Glenside, and one-third to Wesley J. Van Sciver, Wynnewood, Pa.

Application April 28, 1949, Serial No. 90,205

19 Claims. (Cl. 219—39)

1

This invention relates to automatic devices for heating small quantities of water and is directed more particularly to a water heating device for a beverage such as soluble coffee, tea, chocolate, etc.

The present apparatus is characterized by a water supply reservoir from which water is permitted to flow into a pressure tank of predetermined volume. The pressure tank is provided with a spout which delivers heated water from the tank to a beverage cup. The pressure tank is also provided with a heating device which in the instant case may be an electrical heater of the resistance type or of the immersion type. A suitable valve between the reservoir and the pressure tank permits flow of water from the reservoir to the tank and prevents return of water or vapor to the reservoir after the pressure tank is filled. The capacity of the pressure tank is calculated in such a manner that when the water in the tank has been expelled due to the action of the heater, a beverage cup will be substantially filled. Since conventional cups vary somewhat in volume, one embodiment of the invention includes means for regulating the amount of water discharged from the pressure tank in accordance with the volume of the cup. In one form of the invention the electrical circuit is automatically actuated by means of a float, whereas in the case of the resistance heater, the flow of current is dependent upon the presence of an electrically conductive liquid between the elements of the heater. In either event, the heating supply is automatically controlled. Nevertheless, a manual switch may be provided so that the cycle may be interrupted at any desired point.

An important feature of the device resides in the fact that only sufficient water for a single cup is heated at a time, whereupon this water is ejected into the cup and the cycle may be repeated indefinitely by manipulation of only a starting button so long as the supply of water in the main reservoir is replenished.

Further objects will be apparent from the specification and drawings in which:

Fig. 2 is a section similar to Fig. 1, showing a modified form;

Fig. 3 is a sectional detail of the manual switch;

Fig. 4 is an enlarged sectional detail showing the support and electrical connection for the heater in Fig. 2; and

2

Figure 1:
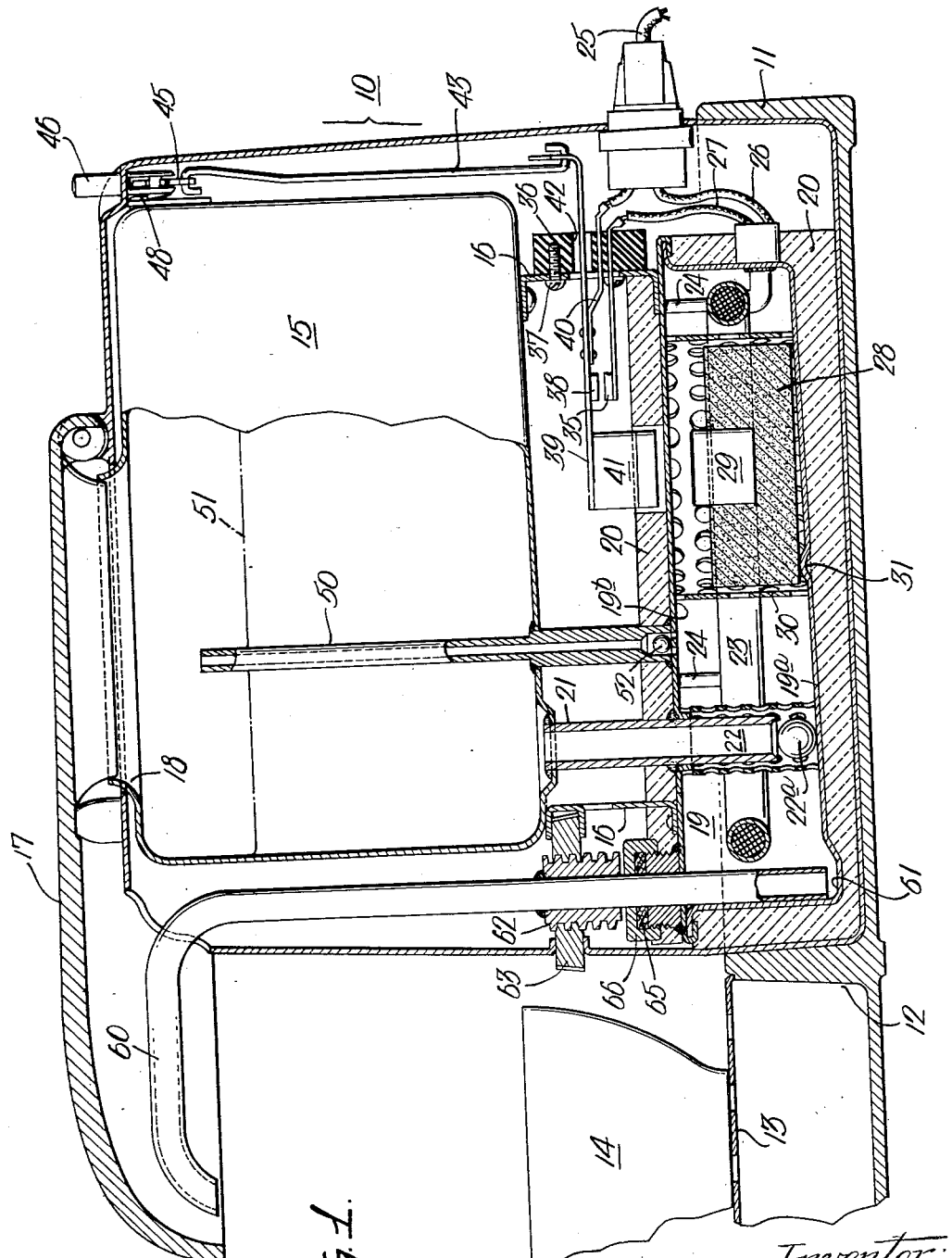
Fig. 1 is a longitudinal section of a heating device constructed in accordance with the invention.

Fig. 5 is a view generally similar to Figs. 1 and 2 but of a further modified form in which a resistance heater is provided in a pressure tank and the valve between the reservoir and the pressure tank is manually controlled.

Referring now more particularly to Fig. 1, the water heater comprises a housing 10 having a base member 11 which extends laterally to provide for a drip reservoir 12 and a perforated support 13 for a beverage cup 14. A primary reservoir 15 occupies the upper part of housing 10 and is supported by brackets 16, 16. Reservoir 15 may be conveniently filled by raising a hinged cover 17 which provides access to the neck 18 of reservoir 15. A pressuring tank 19 occupies the bottom portion of housing 10 and is desirably mounted in and surrounded by a suitable insulating material 20, 20. Liquid communication between reservoir 15 and tank 19 is provided through pipe 21 which has a check valve assembly 22 near the bottom thereof. The valve proper 22a may be of a plastic material such as polyethylene, in order that the valve may float on the liquid in tank 19, thus eliminating the necessity for a valve spring. An immersion heater 23 is mounted in tank 19 by means of supports 24, 24 and is electrically connected to a source of current 25 by means of leads 26 and 27. Tank 19 is provided with a float 28 which may also be of a synthetic material such as polyethylene, and the float carries an armature 29 of some magnetic metal. Float 28 is constrained to move in an up and down direction by means of a perforated cage 30.

Since the bottom 19a of tank 19 slopes downwardly, a raised abutment 31 is provided in the cage 30 so that float 28 will be substantially level even when tank 19 is empty, thus avoiding any tendency for the float to stick in the cage.

The lead 27 is connected to contact 35 of a switch assembly which is in turn mounted in an insulating block 36 secured to bracket 16 by screws 37, 37. Contact 35 is associated with an upper contact 38 on arm 39 which is in turn movably supported from block 36 by means of spring 40. Arm 39 extends beyond contact 38 and carries a permanent magnet 41 positioned to register with armature 29 when the latter is in the raised position directly under the top 19b of tank 19. The opposite end of arm 39 extends through opening 42 in block 36 and is connected with link 43 in such a manner that link 43 and/or arm 39 are permitted to have limited relative movement with respect to each other. A slot 44 in the upturned end of arm 39 is sufficient for this purpose. The upper end of link 43 is connected to the walking beam 45 of a manual actuator having buttons 46, 47 guided by and extending through the top of housing 10 (Fig. 3). Spring 48 controls the operation of walking beam 45 to a limited extent, as will be more fully explained hereinafter.

Tank 19 is also provided with an air vent 50 extending into reservoir 15 and above the normal water line 51 in the reservoir. A ball check valve 52 having a specific gravity greater than water is disposed at the bottom of vent 50 and permits low velocity escape of air from tank 19, but closes when the presence of steam in tank 19 increases the velocity of gaseous discharge through the vent.

Hot water is discharged from tank 19 by means of a spout 60 which is curved upwardly and horizontally so that water may be conveniently discharged into cup 14. The lower end of spout 60 extends into a sump 61 in tank 19 and is adapted to be adjusted vertically with respect to sump 61 so that varying quantities of water may be ejected from the tank in any operating cycle. For this purpose, the vertical portion of spout 60 is provided with an externally threaded collar 62 securely attached to the spout. A captive thumb nut 63 is rotatably mounted in housing 10 and in bracket 16, as shown clearly in Fig. 1. Leakage from tank 19 is prevented by means of a suitable gland comprising packing 65 and gland nut 66. It will be apparent that the depth to which spout 60 extends into sump 61 may be readily controlled by turning nut 63 so that when the spout is lowered, the maximum amount of water will be forced from tank 19, whereas when the spout is raised, the amount of water expelled will be decreased.

In operation, water is poured into reservoir 15 so that tank 19 is also filled through pipe 21. Simultaneously, the water rises in spout 60 to the same level 51 as the water in reservoir 15. When tank 19 fills, check 22a rises to effectively close pipe 21 and float 28 rises so that the armature 29 is directly beneath the top 19b of tank 19, which is of a non-magnetic material. In this position, the attraction of magnet 41 for armature 29 is insufficient to close contacts 35 and 38. With the electrical supply 25 connected, the operator pushes button 47 which raises link 43 so that the top of slot 44 is engaged by the link. This action causes arm 39 to pivot on spring 40, thereby closing contacts 35 and 38 so that the circuit to heater 23 is completed. In this position, the magnet 41 has sufficient attraction for the armature to hold the arm 39 down and the contacts 35 and 38 closed for the duration of the heating cycle.

As the water in tank 19 begins to boil, small quantities of air are expelled through vent 50. The level of the bottom of spout 60 being lower than the level of the vent 50 prevents steam or air from ejecting from spout 60. When more vigorous boiling takes place, the higher velocity flow through check valve 52 closes vent 50 and valve 22a is likewise closed. When the pressure in tank 19 is sufficient to overcome the head of the column of water in spout 60, the boiling water is forced out of the spout and into cup 14. This action in turn lowers float 28, the weight of which is such that the magnet 41 cannot hold it in raised position and permits tension in spring 40 to raise arm 39 and open contacts 35 and 38.

The tension in spring 40, as well as the magnetic attraction between magnet 41 and armature 29 are so adjusted that spring 40 is sufficient to hold the arm 39 in an open position when float 28 is raised, yet spring 40 is insufficient to overcome the attraction between magnet 41 and armature 29 when arm 39 is in the closed position and float 28 is raised. The attraction between the armature and the magnet is not strong enough to interfere with rising and falling of float 28 in tank 19. Whenever button 47 is completely depressed, the heating cycle will be initiated and will continue until automatically stopped by the lowering of float 28. However, it will be noted that pressure tank 19 is automatically refilled from reservoir 15 as soon as atmospheric conditions obtain in the pressure tank. Also, the heater circuit may be opened at any time by pressing button 46 so that the heater may be turned off at the end of a cycle or at any time during a cycle. Since the contacts 35 and 38 are held closed only when the float 28 is in the upper position, it is apparent that the float functions also as a safety to prevent energization of the heater 23 when no water is present in tank 19.

Referring now to Figs. 2–4, a modified form of water heater is designed to operate in substantially the same way as has just been described in connection with the heater shown in Fig. 1. In the modified form, the heater is provided with a casing 70 supported on feet 71, 71 and provided with a drip pan 72 and a perforated support 73 for beverage cup 14. The reservoir 74 is filled with water through neck 75 when lid 76 is raised. The measuring or pressure tank 77 is provided with a float 78 which in this form is of a hollow metallic construction and the float 78 carries an armature 79 which operates in the same manner as described in connection with armature 29. Float 78 is retained in cage 80 so that it is free to rise and fall with the liquid in tank 77.

Fluid passes from reservoir 74 and tank 77 by means of outlet 81 which is provided with a ball check 82 that closes when sufficient pressure is present in the tank 77. An immersion heater 83 is suspended from the top 77a of tank 77 by means of studs 84, 84 (Fig. 4) which are insulated from top 77 by means of suitable bushings 85, 85 and spacers 86, 86. Heater 83 is connected to a source of electrical power 87 by lead 88 and to switch 89 by lead 90. Switch 89 comprises a pivoting arm 91 mounted on spring 92 and provided with a contact 93. Contact 94 is mounted on a rigid arm 95 supported by insulating spacers 96, 96 and connected to power source 87 by line 97.

Spout 100 in the modified form is fixedly mounted on and sealed to tank 77 at 101 and extends downwardly into the tank 77 to provide a means for ejecting the heated water in the same manner as described in connection with Fig. 1. Since spout 100 is fixed on tank 77, the capacity of the tank is adjusted by means of a bellows 102 formed in the bottom 77b of the tank. A cam 103 is associated with bellows 102 and may be rotated by means of shaft 104 mounted in supports 105, 106 and fixed to handle 107. When shaft 104 is turned, cam 103 distends bellows 102, thereby reducing or increasing (as the case may be) the volume of liquid that may be contained in tank 77.

Referring now to Fig. 5, a still further modification of my water heater is provided with a reservoir 120 which has a filler neck 121 and an outlet fitting 122. The pressure tank 123 communicates with reservoir 120 through fitting 122 which has a relatively large diameter ball check 124 spring-loaded upwardly by means of helical spring 125. Ball 124 may be depressed to permit flow of liquid from reservoir 120 into tank 123 by means of plunger 126 which extends through reservoir 120 and is provided with a button 127. An electrical resistance heater 128 is positioned inside tank 123 by means of posts 129 and 130. As is well known in the art, heaters of this type comprise a pair of spaced elements 128a and 128b, electrically insulated from each other and connected to binding posts 131 and 132. When an electrically conductive liquid contacts both elements 128a and 128b of the heater, current flows between the elements to complete the circuit and heat the liquid. When there is no liquid between the elements, the circuit is thereby automatically opened. Tank 123 is provided with a sump 133 and a spout 134 which extends into sump 133. Spout 134 is generally similar to spouts 60 and 100 of Figs. 1 and 2, and is rigidly sealed to tank 123 at 135. As described previously in conjunction with the forms of Figs. 1 and 2, reservoir 120 and tank 123 may be mounted in a housing having a frame 136 and a cup support 137 for cup 14.

In operation, reservoir 120 is filled with water through neck 121. Plunger 126 is then depressed to permit tank 123 to fill. As soon as water surrounds elements 128a and 128b, heating of the water takes place. Pressure on plunger 126 is released to permit the ball check 124 to close the passage between the reservoir and the pressure tank. When sufficient vapor pressure is present in pressure tank 123, the contents of the tank will be discharged through spout 134 into cup 14 as described previously. When this occurs, the heating element is automatically shut off due to the absence of a conductor between elements 128a and 128b. Any residual water remaining in tank 123 will be retained in sump 133. As long as there is a supply of water in reservoir 120, the operation may be repeated merely by pressing button 127 to permit filling of tank 123.

It will thus be apparent that in all forms of the invention the heating means for the water is automatically actuated either by the operation of a float in the pressure tank or merely by the presence of water in the tank. However, in order to prevent flow of current in the absence of water in the pressure tank or when otherwise not desired, it is convenient to provide a manual device which must be actuated in order to initiate the heating and discharge cycle. This manual device may consist of an electrical switch, a means for positioning the magnet, or the manually actuated valve in the form utilizing the electrode heater. The details of construction are relatively rugged, simple and inexpensive to manufacture, and the device is ideally suitable for domestic use in which it is desired to obtain a limited amount of hot water very quickly.

Having thus described my invention, I claim:

1. In a device for heating and discharging measured quantities of a liquid for beverage and like purposes, a reservoir for liquid to be heated, a tank dimensioned to contain a predetermined quantity of liquid connected to said reservoir to receive liquid therefrom, liquid discharge means leading from said tank and operable under elevated vapor pressure of the liquid to discharge a measured quantity thereof, means to heat the liquid in said tank to elevate the vapor pressure thereof, a float in said tank, and means responsive to movement of said float in the tank to control the liquid heating means.

2. In a device for heating and discharging measured quantities of liquid for beverage purposes, a reservoir for liquid to be heated, a tank dimensioned to contain substantially one beverage cup of liquid, a liquid connection between the reservoir and the tank, valve means in said connection, a liquid discharge spout connected to the tank through which liquid is discharged from the tank under elevated vapor pressure, means to heat the liquid in said tank, a float in said tank, and means responsive to movement of said float in the tank to control the liquid heating means.

3. In a device for heating and discharging measured quantities of liquid for beverage purposes, a reservoir for liquid to be heated, a tank dimensioned to contain a predetermined quantity of liquid, a liquid connection between the reservoir and the tank, valve means in said connection, a liquid discharge spout connected to the tank through which the liquid is discharged under elevated vapor pressure in the tank, means for adjusting the inlet to said spout whereby the volume of liquid discharged may be controlled, and means to heat the liquid in said tank.

4. Apparatus in accordance with claim 3, in which the means for regulating the spout comprises an externally threaded collar secured to said spout, and a captive nut adapted to engage the collar.

5. In a device for heating and discharging measured quantities of liquid for beverage purposes, a reservoir for liquid to be heated, a tank dimensioned to contain a predetermined quantity of liquid, a liquid connection between the reservoir and the tank, valve means in said connection, a liquid discharge spout connected to the tank through which liquid is discharged under elevated vapor pressure in the tank, means for varying the volume of the tank to regulate the amount of liquid discharged through the spout, and means to heat the liquid in said tank.

6. Apparatus in accordance with claim 5, in which the volume regulating means for the tank comprises a distendable portion in a tank wall, and cam means adapted to distend said portion upon turning of the cam.

7. In a device for heating and discharging measured quantities of liquid for beverage purposes, a reservoir for liquid to be heated, a tank dimensioned to contain a predetermined quantity of liquid, a liquid connection between the reservoir and the tank, valve means in said connection, a liquid discharge spout connected to the tank through which liquid is discharged from the tank under elevated pressure, an immersion heater mounted in said tank, a float adapted to rise and fall in said tank in accordance with the liquid therein, switch means operatively associated with said immersion heater, and magnetic means on said float and switch to hold the switch closed when the float is raised.

8. In a device for heating and discharging measured quantities of liquid for beverage purposes, a reservoir for liquid to be heated, a tank dimensioned to contain a predetermined quantity of liquid, a liquid connection between the reservoir and the tank, valve means in said connection, a liquid discharge spout connected to the tank through which liquid is discharged from the tank under elevated pressure, an immersion heater mounted in said tank, a float adapted to rise and fall in said tank in accordance with the liquid therein, switch means operatively associated with said immersion heater, magnetic means on said float and switch to hold the switch closed when the float is raised, said magnetic means having insufficient mutual attraction to independently close the switch, and manual means for assisting the attraction of the magnetic means to close the switch.

9. In a device for heating and discharging measured quantities of liquid for beverage purposes, a reservoir for liquid to be heated, a tank dimensioned to contain a predetermined quantity of liquid, a liquid connection between the reservoir and the tank, valve means in said connection, a liquid discharge spout connected to the tank through which liquid is discharged from the tank under elevated pressure, an immersion heater mounted in said tank, a float adapted to rise and fall in said tank in accordance with the liquid therein, switch means operatively associated with said immersion heater, magnetic means associated with said float and said switch, said magnetic means having insufficient mutual attraction to independently close the switch, manual means for assisting the attraction of the magnetic means to close the switch, and a spring associated with said switch whereby the switch will automatically open when the float is substantially lowered.

10. In a device for heating and discharging measured quantities of liquid for beverage purposes, a reservoir for liquid to be heated, a tank dimensioned to contain a predetermined quantity of liquid, a liquid connection between the reservoir and the tank, valve means in said connection, a liquid discharge spout connected to the tank through which liquid is discharged from the tank under elevated pressure, a vent providing communication between the tank and the upper part of the reservoir, a check valve in said vent, and means to heat the liquid in said tank.

11. In liquid heating apparatus, the combination which comprises a housing, a supply reservoir mounted in the upper portion of said housing, a tank mounted in said housing below the supply reservoir, a liquid conduit connecting the reservoir and the tank, a check valve in said conduit, an electrical heating element associated with the tank, a float in said tank, a magnetic armature on said float, a magnetically actuated switch outside the tank and adapted to be opened by lowering the float, electrical connections between the heater and the switch, a spout communicating with the interior of the tank, and manual means for opening and closing the switch.

12. Apparatus in accordance with claim 11, in which the housing is provided with a beverage cup support, and the spout is adapted to direct liquid into a beverage cup when placed on said support.

13. Apparatus in accordance with claim 11, in which the inlet end of the spout is adjustable vertically to provide variable quantities of liquid when ejected from the tank.

14. Apparatus in accordance with claim 11, having an air vent connecting the tank and the reservoir, and a check valve associated with said air vent adapted to close the vent upon relatively high velocity escape of vapor from the tank.

15. Apparatus in accordance with claim 11, in which the spout is provided with means for raising and lowering the spout in the tank whereby the amount of hot liquid ejected from the tank may be varied.

16. Apparatus in accordance with claim 11, in which the volume of the tank is variable by cam means located exteriorly of the tank.

17. Apparatus in accordance with claim 11, in which the switch comprises a pivoting contact point, a magnet attached to said pivoting contact point, spring means for controlling the pivoting of said point, the spring means, magnet and armature being so adjusted that the attraction between the magnet and the armature is insufficient to overcome the weight of the armature and float when liquid is ejected from the tank, but the attraction is sufficient to hold the switch closed only when the float is substantially in a raised position.

18. In a device for heating and discharging measured quantities of a liquid for beverage and like purposes, a reservoir for liquid to be heated, a tank dimensioned to contain a predetermined quantity of liquid connected to said reservoir to receive liquid therefrom, liquid discharge means leading from said tank operable under elevated vapor pressure of the liquid to discharge a measured quantity thereof, and heating means responsive to the presence of a predetermined amount of liquid in the tank for heating said liquid and elevating the vapor pressure thereof.

19. In a device for heating and discharging measured quantities of a liquid for beverage and like purposes, a reservoir for liquid to be heated, a tank dimensioned to contain a predetermined quantity of liquid connected to said reservoir to receive liquid therefrom, liquid discharge means leading from said tank operable under elevated vapor pressure of the liquid to discharge a measured quantity thereof, electrical heating means in said tank to elevate the vapor pressure of liquid in the tank, and an electrical circuit for said heating means, said circuit being responsive to the presence of a predetermined amount of liquid in the tank.

EDWIN P. VAN SCIVER.

REFERENCES CITED

The following references are of record in the file of this patent:

UNITED STATES PATENTS

| Number | Name | Date |
|---|---|---|
| 1,946,573 | De Vries | Feb. 13, 1934 |
| 1,980,735 | Smith | Nov. 13, 1934 |
| 2,114,063 | Stoner | Apr. 12, 1938 |
| 2,119,455 | De Ayala | May 31, 1938 |
| 2,169,852 | Scott | Aug. 15, 1939 |
| 2,180,655 | Abbate | Nov. 21, 1939 |
| 2,300,300 | Lund | Oct. 27, 1942 |